Figure 1:
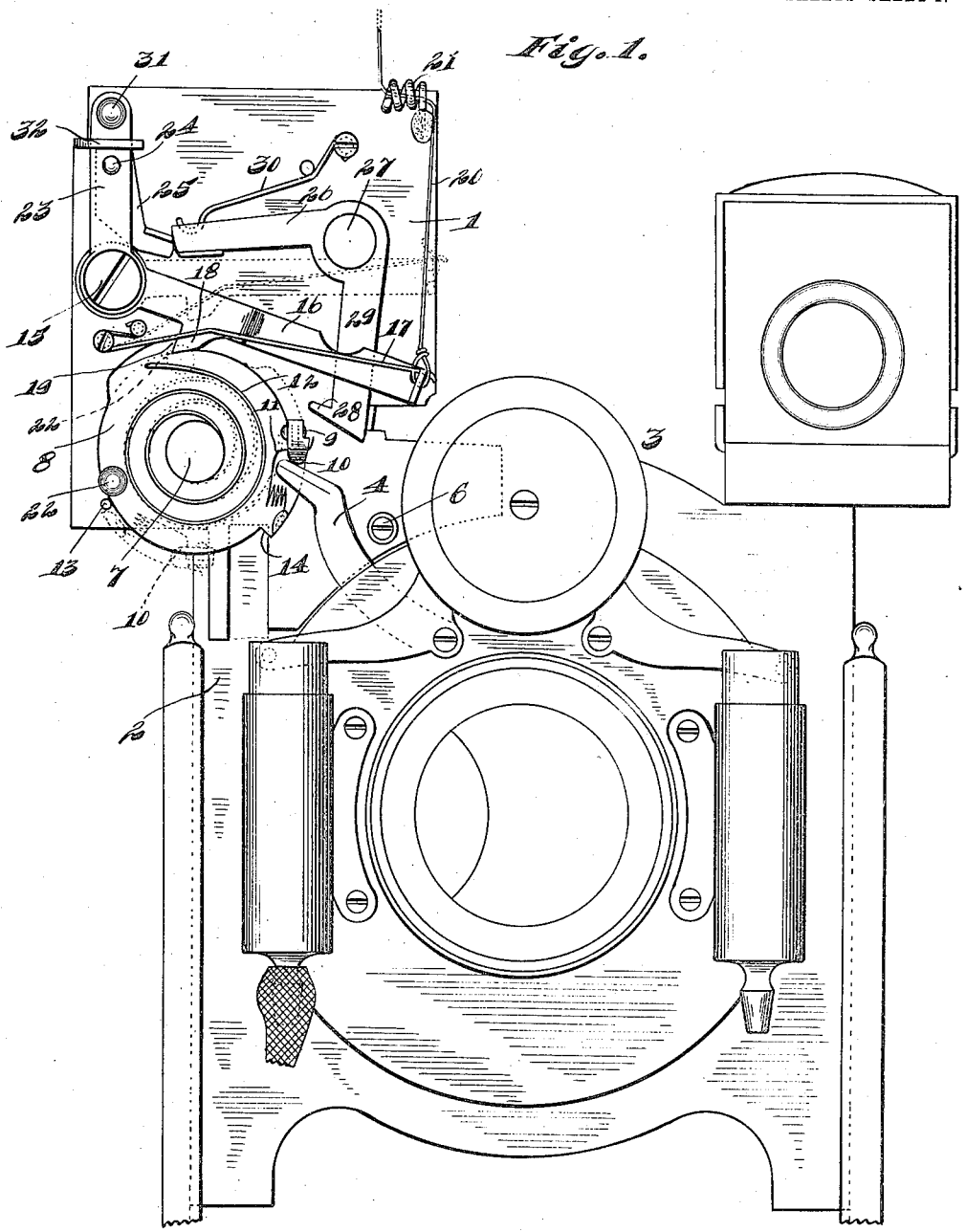

H. H. McANELLY.
TRIPPING MECHANISM FOR CAMERA SHUTTERS.
APPLICATION FILED MAR. 23, 1912.

1,043,951.

Patented Nov. 12, 1912.

2 SHEETS—SHEET 1.

Witnesses:
C. E. Wessels.
A. A. Olson.

Inventor:
Homer H. McAnelly,
By Joshua R. H. Potts
his Attorney.

H. H. McANELLY.
TRIPPING MECHANISM FOR CAMERA SHUTTERS.
APPLICATION FILED MAR. 23, 1912.
1,043,951.
Patented Nov. 12, 1912.
2 SHEETS—SHEET 2.
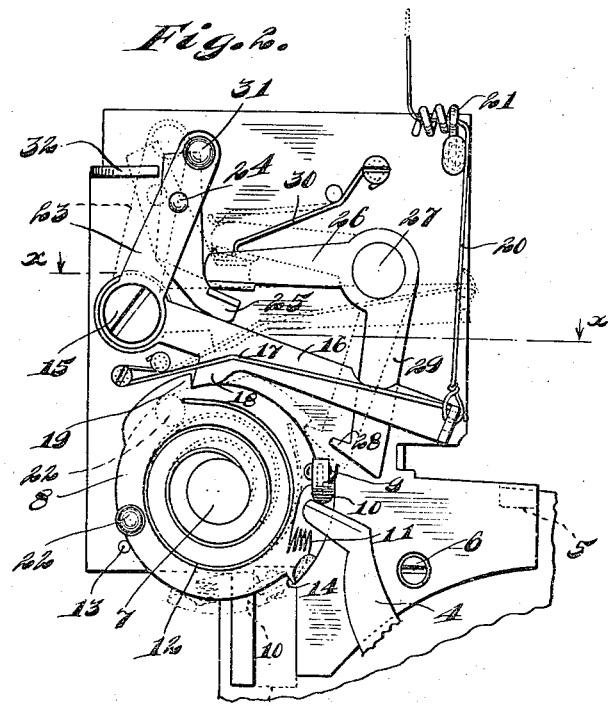
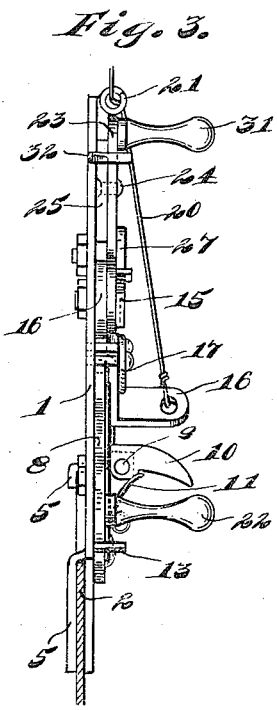
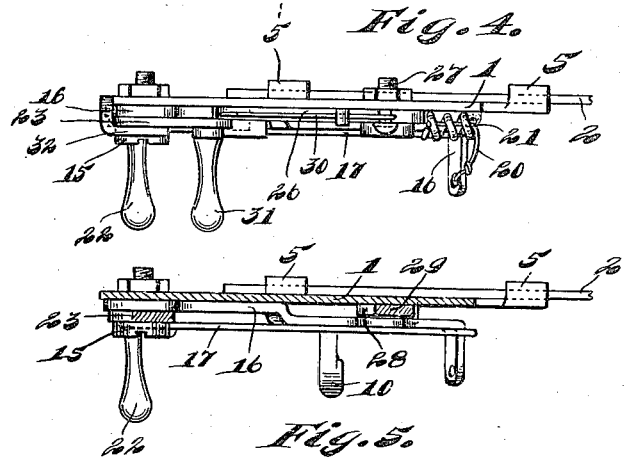
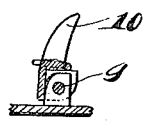

UNITED STATES PATENT OFFICE.

HOMER H. McANELLY, OF CHICAGO, ILLINOIS.

TRIPPING MECHANISM FOR CAMERA-SHUTTERS.

1,043,951. Specification of Letters Patent. Patented Nov. 12, 1912.

Application filed March 23, 1912. Serial No. 685,729.

*To all whom it may concern:*

Be it known that I, HOMER H. McANELLY, a citizen of the United States, and a resident of the city of Chicago, county of Cook, and State of Illinois, have invented certain new and useful Improvements in Tripping Mechanism for Camera-Shutters, of which the following is a specification.

My invention relates to improvements in tripping mechanism for photographic shutter operating levers, and has for its object the production of mechanism of this character which will be of improved construction and efficient in operation.

Other objects will appear hereinafter.

With these objects in view, my invention consists in the combinations and arrangements of parts hereinafter described and claimed.

My invention will be more readily understood by reference to the accompanying drawings forming a part of this specification, and in which—

Figure 1 is a front elevation of a conventional form of camera upon which is arranged a shutter lever tripping mechanism embodying my invention, the mechanism being arranged for use in the taking of a "snap shot", Fig. 2 is a front view of the tripping mechanism, and a portion of the camera supporting the same, the former being shown arranged for use in the taking of a "time" exposure with the camera, Fig. 3 is a side elevation of the construction shown in Fig. 2, Fig. 4 is a top plan view of the construction shown in Fig. 2, Fig. 5 is a transverse section taken on substantially line *x x* of Fig. 2, and Fig. 6 is a sectional detail of the pivoted pawl which contacts with the shutter operating lever.

The preferred form of construction, as illustrated in the drawings, comprises a flat plate 1 which is adapted to be mounted upon the upper edge of the front plate 2 of a conventional camera 3 in operative proximity with the oscillatory operating lever 4 of the shutter of the camera, it being understood that depression or downward rocking of the lever 4 effects the operation of the shutter. The plate 1 is provided with gripping ears 5 which embrace the upper edge of the plate 2, said ears together with a screw 6 being adapted to securely fasten the plate 1 in the position shown upon the camera.

Rotatably mounted at 7 upon the plate 1 is a disk 8 upon which is pivotally mounted at 9 an outwardly projecting pawl 10. The pawl 10 is so positioned that, when the disk 8 is rotated or oscillated, the same will be adapted to engage the outer end of the lever 4 in order to actuate the same, as above mentioned. The pawl 10 is so arranged as to be adapted to operate the lever 4 only when the disk 8 is rotated in a clockwise direction. Said pawl, when said disk is reversely rotated or when the same is rotated in a counter clockwise direction, will yield and rock downwardly so as to pass said lever. A spring 11 coöperates with the pawl 10 to normally hold the same in extended or operative position. Coöperating with the disk 8 is a torsional spring 12 through the medium of which said disk is rotated, when released in order to carry the pawl 10 into engagement with the lever 4 to effect actuation of the latter. A stop 13 is provided upon the plate 1 which is adapted for engagement by a shoulder 14 provided at the periphery of the disk 8 to determine the amplitude of oscillation of said disk.

Fulcrumed at 15 upon the plate 1 above the disk 8 is a detent 16 with which coöperates a spring 17 which is adapted to normally hold said detent so that a tooth 18 provided at the lower edge thereof will engage with a shoulder or tooth 19 provided at the periphery of the disk 8 to hold the latter in position for operation. The spring 12 is so arranged that when the tooth 18 is in engagement with the shoulder 19, the former will be in tension, and so that when the detent 16 is rocked upwardly to release said disk, the latter will be rotated by virtue of said spring to move the pawl 10 so as to actuate the lever 4, as will be readily understood. This oscillation of the detent 16 in order to release the disk 8, is effected by a flexible cord 20 which is connected with the free end of said detent, said cord passing upwardly through a guide eye 21 provided upon the plate 1 at the upper edge thereof whence said cord may be directed as desired so as to render it possible to operate or oscillate the detent 16 from any desired location. This being so, it will be seen that, if desired, the photographer may be included in the picture which he is taking. An outwardly projecting finger piece or handle 22 is provided upon the disk 8 for manually rotating the latter in a reverse or counter clockwise direction for setting the mechanism for the actuation of the shutter lever.

The construction thus far described is designed, as will be observed, for instantaneous operation of the camera shutter or for taking a "snap shot", since, in the mechanism described, when the same is operated, the shutter operating lever 4 will be simply rocked downwardly and then released. Provision is also made for the taking of a "time" exposure, that is, for opening the shutter and permitting the same to remain open a desired length of time and then permitting the shutter to close. The mechanism for adapting the device for use in this capacity comprises a rocker arm 23 which is fulcrumed at 15. Pivoted at 24 to the arm 23 is a dog 25, said dog being so designed that, when the upper end of the arm 23 is rocked to the right, the lower end of said dog will be interposed between the upper edge of the detent 16 and the under side of the arm 26 of a bell crank lever which is pivoted at 27, as clearly shown in Fig. 2, and so that, when said detent is rocked upwardly, as above mentioned, in order to release the disk 8, the arm 26 of the bell crank lever will be simultaneously moved upwardly so as to force the tooth 28 which is provided at the lower end of the other arm 29 of said bell crank, into the path of movement of the shoulder 19. With this arrangement, it will be seen that, when the cord 20 is pulled, in order to move the detent 16 to releasing position, the disk 8 will be permitted to rotate only a portion of the distance which the same is capable of moving or only to such an extent as to effect the depression of the lever 4, in which position of said lever the shutter will be open. Said lever and hence said shutter will be held in this position until the operating cord is released in order to permit of the tooth 28 being moved out of engagement with the shoulder 19, in which event said disk 8 will complete its oscillatory movement and the pawl 10 will be moved to release the lever 4 in order to effect the closing of the shutter. Thus a "time" exposure may be taken with the camera through the employment of the present mechanism.

A shutter lever tripping mechanism of the construction set forth is durable and economical, the same is positive and quick acting in operation, and of high efficiency in use.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. The combination with a camera having a shutter operating lever of a tripping device for coöperation with said lever comprising a spring controlled oscillatory member; a pawl carried upon said member and adapted when the latter is oscillated to contact with and operate said lever; a detent for releasably holding said oscillatory member in position for operation; and means for moving said detent to releasing position, substantially as described.

2. The combination with a camera having an oscillatory shutter operating lever of a tripping device for coöperation with said lever comprising a spring controlled oscillatory member; a pawl carried upon said member and adapted when the latter is oscillated to operate said lever; an oscillatory detent for releasably holding said oscillatory member in position for operation; and means for moving said detent to releasing position, substantially as described.

3. The combination with a camera having an oscillatory shutter operating lever of a tripping device for coöperation with said lever comprising a spring controlled oscillatory member; a pawl carried upon said member and adapted when the latter is oscillated to operate said lever; an oscillatory detent for releasably holding said oscillatory member in position for operation; and a cord for rocking said detent to releasing position, substantially as described.

4. The combination with a camera having an oscillatory shutter operating lever of a tripping device for coöperation with said lever, said device comprising a spring controlled oscillatory disk; a pawl mounted upon said disk adjacent the periphery thereof and adapted when said disk is released and oscillated to operate said lever; an oscillatory detent for releasably engaging said disk to hold the same in position for operation; and means for moving said detent to releasing position, substantially as described.

5. The combination with a camera having an oscillatory shutter operating lever of a tripping device for coöperation with said lever, said device comprising a spring controlled oscillatory disk; a pawl mounted upon said disk adjacent the periphery thereof and adapted when said disk is released and oscillated to operate said lever; an oscillatory detent for releasably engaging a tooth in the periphery of said disk for holding the latter in position for operation; and means for rocking said detent to releasing position, substantially as described.

6. The combination with a camera having an oscillatory shutter operating lever of a tripping device for coöperation with said lever, said device comprising a spring controlled oscillatory disk; a spring held pawl mounted upon said disk adjacent the periphery thereof and adapted when said disk is released from operative position and oscillated to contact with and operate said lever and when said disk is reversely oscillated to yield and pass said lever; a movable detent for releasably engaging said disk to hold the same in position for operation; and means for moving said detent to releasing position, substantially as described.

7. The combination with a camera having an oscillatory shutter operating lever of a tripping device for coöperation with said lever, said device comprising a spring controlled oscillatory disk; a spring held pawl mounted upon said disk adjacent the periphery thereof and adapted when said disk is released from operative position and oscillated to contact with and operate said lever and when said disk is reversely oscillated to yield and pass said lever; a movable detent for releasably engaging said disk to hold the same in position for operation; means for moving said detent to releasing position; and a finger piece for reversely oscillating said disk, substantially as described.

8. The combination with a camera having an oscillatory shutter operating lever of a tripping device for coöperation with said lever, said device comprising a spring controlled oscillatory disk; a pawl mounted upon said disk adjacent the periphery thereof and adapted when said disk is released and oscillated to operate said lever; an oscillatory detent for releasably engaging disk to hold the same in position for operation; means for moving said detent to releasing position; and a stop for determining the amplitude of oscillation of said disk, substantially as described.

9. The combination with a camera having an oscillatory shutter operating lever of a tripping device for actuating said lever, said device comprising a spring controlled rotary member; a pawl carried upon said member and adapted when the latter is rotated to actuate said lever; a detent for releasably holding said oscillatory member in position for operation; means for moving said detent to releasing position; a movable stop adapted to interrupt the movement of said rotary member and permit of said member rotating through only a part of its operative movement; and means for establishing an operative connection between said stop and said detent whereby movement of the latter to releasing position effects movement of said stop to operative position, substantially as described.

10. The combination with a camera having an oscillatory shutter operating lever of a tripping device for actuating said lever, said device comprising a spring controlled rotary member; a pawl carried upon said member and adapted when the latter is rotated to actuate said lever; a detent for releasably holding said oscillatory member in position for operation; means for moving said detent to releasing position; a movable step adapted to interrupt the movement of said rotary member and permit of said member rotating through only a part of its operative movement; resilient means for normally holding said stop in inoperative position; and means for establishing an operative connection between said stop and said detent whereby movement of the latter to releasing position effects movement of said stop to operative position, substantially as described.

11. The combination with a camera having an oscillatory shutter operating lever of a tripping device for actuating said lever, said device comprising a spring controlled rotary disk; a pawl mounted upon said disk adjacent the periphery thereof and adapted when said disk is released and rotated to actuate said lever; an oscillatory detent for releasably engaging said disk to hold the same in position for operation; means for oscillating said detent to releasing position; an oscillatory stop adapted to interrupt the movement of said rotary member and permit of rotation of said member through only a part of its operative movement; resilient means for normally holding said stop in inoperative position; and a manually movable member adapted to establish an operative connection between said stop and said detent whereby movement of the latter to releasing position effects movement of said stop to operative position, substantially as described.

12. The combination with a camera having a shutter operating lever of a tripping device for actuating said lever, said device comprising an attachable plate; a spring controlled oscillatory member mounted upon said plate; a pawl carried upon said member and adapted when the latter is oscillated to actuate said lever; a detent mounted upon said plate for releasably holding said oscillatory member in position for operation; and means for moving said detent to releasing position, substantially as described.

In testimony whereof I have signed my name to this specification in the presence of two subscribing witnesses.

HOMER H. McANELLY.

Witnesses:
 JOSHUA R. H. POTTS,
 ARTHUR A. OLSON.